United States Patent [19]

West, III

[11] Patent Number: 4,898,422
[45] Date of Patent: Feb. 6, 1990

[54] ARROWHEAD BICYCLE SADDLE

[76] Inventor: Robert V. West, III, 8480 Fredericksburg Rd., #339, San Antonio, Tex. 78229

[21] Appl. No.: 245,286

[22] Filed: Sep. 15, 1988

[51] Int. Cl.⁴ .............................................. B62J 1/00
[52] U.S. Cl. ..................................... 297/202; 297/195
[58] Field of Search ........................ 297/195, 202, 214

[56] References Cited

U.S. PATENT DOCUMENTS

| 556,250 | 3/1896 | Brown | 297/202 |
|---|---|---|---|
| 576,969 | 2/1897 | Hunt | 297/202 |
| 581,464 | 4/1897 | Hollenbeck | 297/202 |
| 621,607 | 3/1899 | Holden | 297/202 |
| 1,538,542 | 5/1925 | Blake | 297/202 |
| 1,858,477 | 5/1932 | Blake | 297/202 |

FOREIGN PATENT DOCUMENTS

| 16854 | 5/1898 | Switzerland | 297/195 |
|---|---|---|---|
| 9057 | of 1895 | United Kingdom | 297/195 |

Primary Examiner—Peter R. Brown

[57] ABSTRACT

The disclosure relates to a bicycle seat having a narrow front portion which broadens to a wider rear portion. A central cut-out of arrowhead shape is formed in the seat to provide relief for an occupants external genitalia. An elevated hump structure is also included on the seat surface to provide a rest for the superficial perineal space of an occupant. The particular structural characteristics of the seat improve the qualities of seat design and user comfort.

1 Claim, 2 Drawing Sheets

ARROWHEAD BICYCLE SADDLE

BACKGROUND OF THE INVENTION

This invention relates to bicycle seats. More specifically, this invention relates to improvements in the saddle portion of a bicycle seat and is intended to improve the qualities of seat design and user comfort.

At the present time many general purpose bicycle saddles and high performance bicycle saddles are designed with a narrow leading end portion, a central transition portion and a wider or flared trailing end portion. The saddle surface is generally flat and fashioned with downwardly contoured side panels and the front and rear ends thereof include a downwardly projecting tip and an anchor respectively. A tubular frame underlies and supports the saddle between the tip and anchor in a posture above a bicycle saddle post.

Although considerable effort has been directed at improving rider comfort through the development of bicycle seat pads, insufficient attention has been placed upon surface contours. Pressure points are always going to exist where the rider's pelvic structures rest on the saddle surface. Currently, the anterior weight of the rider's pelvis is forced to straddle the central portion of the saddle surface, compressing sensitive neural, vascular, urologic, and genital structures between the pubis and the crest of the saddle. The medical sequelae being recognized as pudendal neuritis, torsion of the testes, membranous urethritis, and vascular compression. This translates into sexual and urinary dysfunction after prolonged pressure. The posterior weight of the rider currently rests on the wider flared posterior saddle surface.

OBJECTS OF THE INVENTION

The Arrowhead Saddle is designed to articulate with the human pelvis in such a way as to enhance rider comfort and health by creating surface contours that support the anterior pelvic structures and alleviate the current situation where these structures are forced to straddle the crest of the central saddle. More specifically, the goal is to maximize pressure over the ischiopubic rami and superficial perineal space of the pelvis, thereby minimizing pressure on sensitive neural, vascular, and urologic structures which comprise the human genitalia. This purpose is further served by the peculiar arrowhead cutout creating a pressure free zone in which the above structures can rest.

THE DRAWINGS

The objects and advantages of the present invention will become apparent from the following detailed description of the Arrowhead saddle taken in conjunction with the accompanying drawings where:

DETAILED DESCRIPTION

Figure 1:
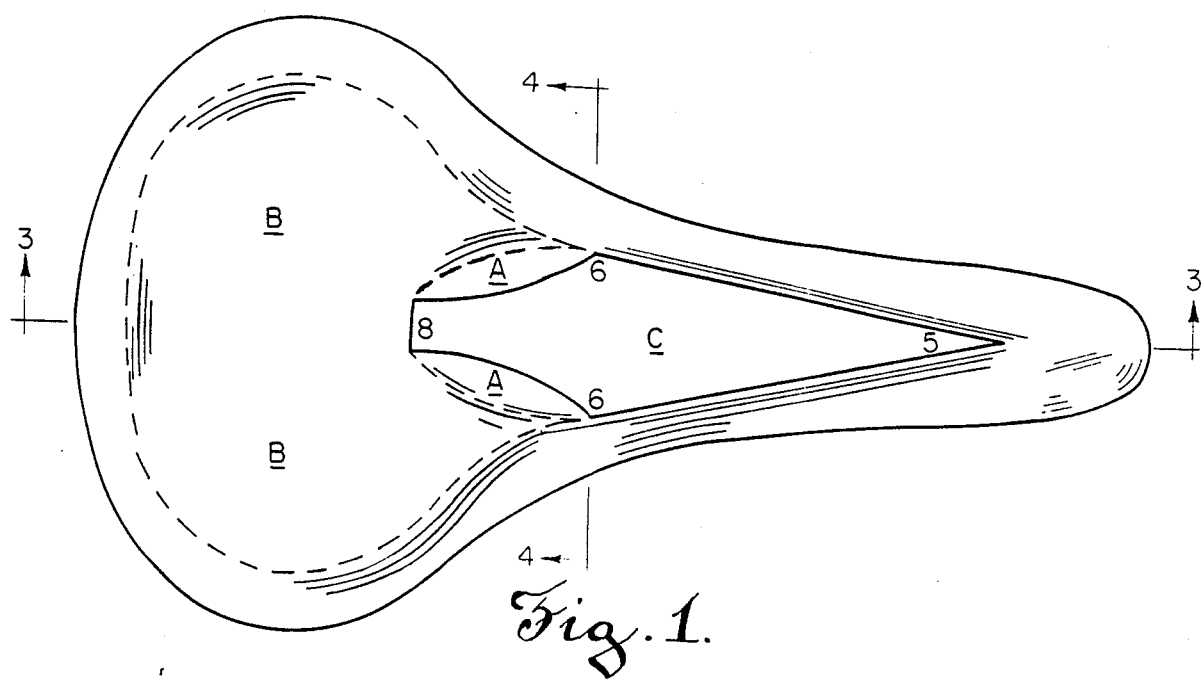
FIG. 1 is a top view of a bicycle saddle having a narrow leading end portion; a central arrow head cutout C and a flared trailing end portion; the cross hatched line on the surface defines zones A and B of rider contact and the shape of the proposed detachable pad.
Figure 2:
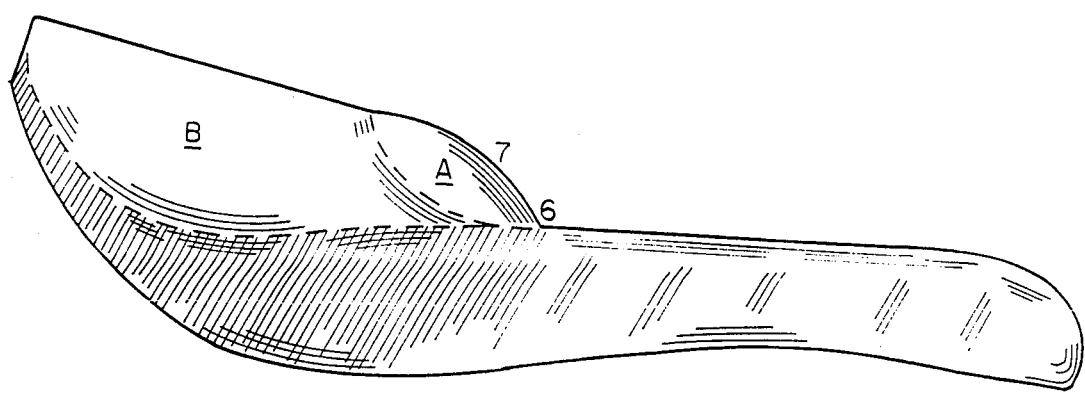
FIG. 2 is a lateral view showing surface contours of the saddle surface. Notable features are surface elevations at 7 and the recessed cutaways 6, which are the wingtips of the arrowhead.
Figure 3:
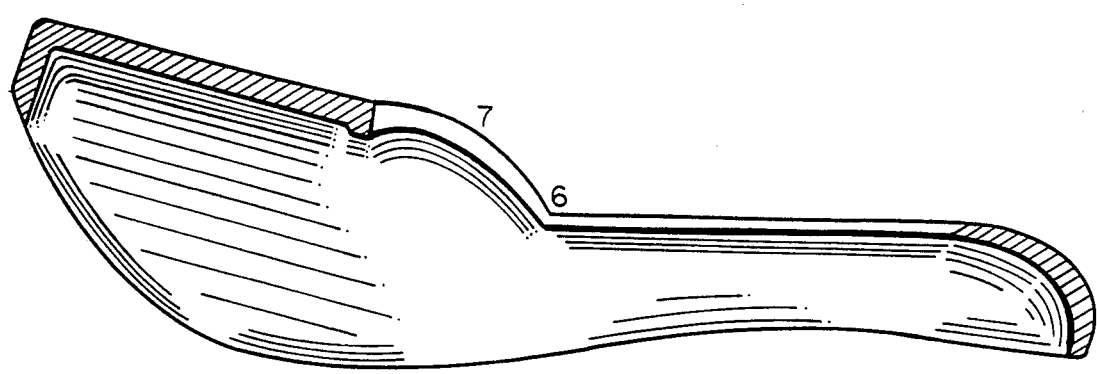
FIG. 3 is a lateral view taken after a longitudinal cross sectional cut along line 3—3 in FIG. 1.

Returning now to FIGS. 1 through 4 there will be seen the general embodiment of the saddle structure and the details which define the invention. In FIG. 1, the observer's eye will view the top surface of the saddle with two general pressure zones delineated by dotted lines, labeled A and B. These zones represent areas where the rider's weight bearing structure will interact with the saddle surface. More specifically, zone A, which is actually an elevated hump 7, will articulate with the rider's ischiopubic rami and superficial perineal space. Zone B is where the rider's ischial tuberosity will rest on the saddle surface. These zones A and B thus represent four specific weight bearing zones to enhance rider comfort by weight redistribution.

In the central portion of the saddle surface is a large cutout area in the shape of an arrowhead C. Transposing this view onto the lateral view, FIG. 2, one can appreciate some of the landmarks corresponding to the arrowhead. The recess in the lateral contour 6 represents one of the flared wingtips of the arrowhead cutout C. The recess 8 corresponds to the tail of the arrowhead.

Figure 4:
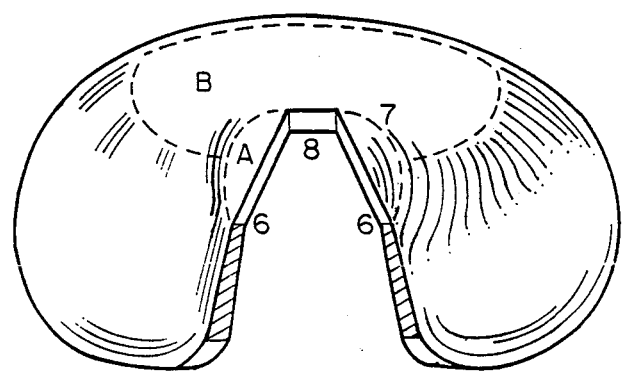
FIG. 4 is a cross-sectional view taken along section line 4—4 in FIG. 1 displaying surface contours at the base of arrowhead, and the mid-section of the saddle surface.

Behind these depressions one can appreciate the bulging contours of the hump structures 7 which form the rear margin of the arrowhead. These humps also correspond with pressure zones A on the top view. These humps converge towards the midline at point 8 where their contour again becomes flush with the surface area of pressure zone B. FIG. 4 which is a cross-section through the rear base of the arrowhead at the wingtips 6. This reveals the cross-sectional contour of the critical midsection further defining surface features referred to above.

The saddle is fabricated from a polyurethane composition having leather-like properties. In many instances it may be desirable to attach a cushioning pad, not shown, to the upper surface of the saddle to enhance rider comfort and saddle performance as previously mentioned. The shape of this pad would be defined by the cross hatched line defining pressure zone A and B. It is my intent to construct this pad so as to be detachable from the polymer shell of the saddle structure, along the line defining zone A and B.

What I claim is, having designed a bicycle seat which is unique in:

1. A bicycle seat having a narrow front portion which broadens from a forward edge rearwardly to a wider rear portion having a rear edge; characterized by a central cut-out having an arrow-head shape extending from a leading tip located near the forward edge of the seat to a wider mid-section, approximately halfway between the front and rear edges; said cut-out including a trailing edge portion which narrows in a rearward direction from the mid-section to a rear tip located intermediate the mid-section of the cut-out and the rear edge of the seat, and wherein the seat is relatively flat from the forward edge to the mid-section of the cut-out but which includes an elevated hump structure which borders the trailing edge and rear tip of the cut-out and which extends from the mid-section to the rear of the seat, whereas the hump structure will provide a rest for the superficial perineal space of an occupant while the cut-out provides a receptacle for the external genitalia.

* * * * *